United States Patent
Ito et al.

(10) Patent No.: US 11,976,147 B2
(45) Date of Patent: *May 7, 2024

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE AND METHOD OF PRODUCING SAME, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Yukie Ito, Tokyo (JP); Tomoya Murase, Tokyo (JP); Takafumi Sekimoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 650 days.

This patent is subject to a terminal disclaimer.

(21) Appl. No.: 17/255,430

(22) PCT Filed: Jun. 18, 2019

(86) PCT No.: PCT/JP2019/024101
§ 371 (c)(1),
(2) Date: Dec. 23, 2020

(87) PCT Pub. No.: WO2020/004145
PCT Pub. Date: Jan. 2, 2020

(65) Prior Publication Data
US 2021/0218030 A1    Jul. 15, 2021

(51) Int. Cl.
*C08F 220/14* (2006.01)
*H01M 4/04* (2006.01)
*H01M 4/36* (2006.01)
*H01M 4/505* (2010.01)
*H01M 4/525* (2010.01)
*H01M 4/583* (2010.01)
*H01M 4/62* (2006.01)
*H01M 4/66* (2006.01)
*C08F 220/18* (2006.01)

(52) U.S. Cl.
CPC ......... *C08F 220/14* (2013.01); *H01M 4/0404* (2013.01); *H01M 4/366* (2013.01); *H01M 4/505* (2013.01); *H01M 4/525* (2013.01); *H01M 4/583* (2013.01); *H01M 4/622* (2013.01); *H01M 4/662* (2013.01); *C08F 220/1804* (2020.02)

(58) Field of Classification Search
None
See application file for complete search history.

(56) References Cited

U.S. PATENT DOCUMENTS

| | | |
|---|---|---|
| 2013/0280606 A1 | 10/2013 | Sekine |
| 2013/0330622 A1 | 12/2013 | Sasaki |
| 2015/0050555 A1* | 2/2015 | Fukumine ........... H01M 10/052 429/217 |

FOREIGN PATENT DOCUMENTS

| | | |
|---|---|---|
| JP | 2003223895 A | 8/2003 |
| JP | 2004185826 A | 7/2004 |
| JP | 2012204303 A | 10/2012 |
| WO | 2012091001 A1 | 7/2012 |
| WO | 2012115096 A1 | 8/2012 |
| WO | 2015064099 A1 | 5/2015 |
| WO | 2017074124 A1 | 5/2017 |
| WO | 2017099481 A1 | 6/2017 |

OTHER PUBLICATIONS

Aug. 13, 2019, International Search Report issued in the International Patent Application No. PCT/JP2019/024101.
Dec. 29, 2020, International Preliminary Report on Patentability issued in the International Patent Application No. PCT/JP2019/024101.

* cited by examiner

*Primary Examiner* — Carlos Barcena
(74) *Attorney, Agent, or Firm* — KENJA IP LAW PC

(57) ABSTRACT

A binder composition for a non-aqueous secondary battery electrode contains: a polymer A including a (meth)acrylic acid ester monomer unit; a polymer B having an iodine value of not less than 5 g/100 g and not more than 100 g/100 g; a polymer C including a nitrile group-containing monomer unit in a proportion of not less than 70 mass % and not more than 98 mass %; and an organic solvent.

10 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE AND METHOD OF PRODUCING SAME, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a slurry composition for a non-aqueous secondary battery electrode and method of producing the same, an electrode for a non-aqueous secondary battery, and a non-aqueous secondary battery.

BACKGROUND

Non-aqueous secondary batteries such as lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher non-aqueous secondary battery performance.

An electrode used in a non-aqueous secondary battery (hereinafter, also referred to simply as a "secondary battery") such as a lithium ion secondary battery normally includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

In recent years, attempts have been made to improve slurry compositions used in the formation of electrode mixed material layers in order to further improve secondary battery performance.

For example, Patent Literature (PTL) 1 proposes a slurry composition for a lithium ion secondary battery positive electrode that contains a conductive material having a BET specific surface area of 400 m$^2$/g or more and a specific binder. Features of the slurry composition for a positive electrode according to PTL 1 are that the slurry composition contains (1) a fluorine-containing polymer X, (2) a polymer Y including a nitrile group-containing monomer unit in a proportion of 10 mass % to 50 mass %, and (3) a polymer Z including a (meth)acrylic acid alkyl ester monomer unit in a proportion of 50 mass % to 90 mass % as the binder, and the proportion constituted by the polymer X among the overall binder is 50 mass % to 95 mass %. The slurry composition for a positive electrode has excellent viscosity stability and can improve cycle characteristics and rate characteristics of a lithium ion secondary battery.

CITATION LIST

Patent Literature

PTL 1: WO2015/064099A1

SUMMARY

Technical Problem

In recent years, there has been demand for further enhancing battery characteristics such as rate characteristics and cycle characteristics (hereinafter, also referred to simply as "battery characteristics") of secondary batteries. A binder composition that is to be used in order to produce a secondary battery having excellent battery characteristics needs to enable a sufficiently high solid content concentration when used in production of a slurry composition. It is also important that in an electrode formed using the binder composition, an electrode mixed material layer and a current collector can display sufficient adhesive strength (i.e., that peel strength can be sufficiently increased).

However, a binder composition that has been used in production of the conventional slurry composition described above leaves room for improvement in terms of achieving a balance of sufficiently high levels of sufficiently increasing the solid content concentration of a slurry composition, sufficiently increasing adhesiveness between an electrode mixed material layer and a current collector in an obtained electrode, and sufficiently enhancing battery characteristics.

Accordingly, one object of the present disclosure is to provide a binder composition for a non-aqueous secondary battery electrode that can sufficiently increase the solid content concentration of an obtained slurry composition and the peel strength of an obtained electrode mixed material layer, and that can also enhance battery characteristics of a secondary battery including an obtained electrode.

Another object of the present disclosure is to provide a slurry composition for a non-aqueous secondary battery electrode, and method of producing the same, that has a sufficiently high solid content concentration, that can sufficiently increase the peel strength of an obtained electrode mixed material layer, and that can enhance battery characteristics of an obtained secondary battery.

Yet another object of the present disclosure is to provide an electrode for a non-aqueous secondary battery that can sufficiently improve battery characteristics of a non-aqueous secondary battery and a non-aqueous secondary battery that has excellent battery characteristics such as rate characteristics and cycle characteristics.

Solution to Problem

The inventors conducted diligent investigation with the aim of solving the problems described above. The inventors discovered that the problems described above can be advantageously solved by using a binder composition for a non-aqueous secondary battery electrode containing three types of polymers satisfying specific chemical compositions or properties, and, in this manner, completed the present disclosure.

Specifically, the present disclosure aims to advantageously solve the problems set forth above, and a presently disclosed binder composition for a non-aqueous secondary battery electrode comprises a polymer A, a polymer B, a polymer C, and an organic solvent, wherein the polymer A is a particulate polymer including a (meth)acrylic acid ester monomer unit, the polymer B is a highly soluble polymer having an iodine value of not less than 5 g/100 g and not more than 100 g/100 g, and the polymer C is a highly soluble polymer including a nitrile group-containing monomer unit in a proportion of not less than 70 mass % and not more than 98 mass % when all monomer units of the polymer C are taken to be 100 mass %, in total. Through a binder composition that contains the polymers A to C set forth above in this manner, it is possible to sufficiently increase the solid content concentration of a slurry composition and the peel strength of an obtained electrode mixed material layer, and to enhance battery characteristics of a secondary battery including an obtained electrode.

Note that in the present specification, "(meth)acryl" is used to indicate "acryl" or "methacryl". Also note that the types of monomer units included in a given polymer and the proportion constituted by each type of monomer unit in the polymer can be identified or measured by a nuclear magnetic resonance (NMR) method such as $^1$H-NMR. Moreover, the phrase "includes a monomer unit" means that "a polymer obtained with the monomer includes a repeating unit derived from the monomer". Furthermore, a method described in the EXAMPLES section can be used to judge whether a given polymer is "highly soluble". Also, the "iodine value" of the polymer B can be measured by a method described in the EXAMPLES section.

In the presently disclosed binder composition for a non-aqueous secondary battery electrode, the polymer A preferably further includes an ethylenically unsaturated acid monomer unit. When the polymer A further includes an ethylenically unsaturated acid monomer unit, the polymer A can display even better binding capacity, and the peel strength of an electrode mixed material layer formed using a slurry composition for a non-aqueous secondary battery electrode that contains the binder composition can be even better increased.

In the presently disclosed binder composition for a non-aqueous secondary battery electrode, the polymer B preferably has a weight-average molecular weight of not less than 5,000 and not more than 500,000. When the weight-average molecular weight of the polymer B is within the range set forth above, dispersibility of a conductive material and the like in a slurry composition for a non-aqueous secondary battery electrode that contains the binder composition can be increased. Moreover, the peel strength of an electrode mixed material layer that is obtained using the slurry composition can be further increased. Furthermore, battery characteristics such as cycle characteristics of a secondary battery that includes the electrode can be further enhanced.

Note that the "weight-average molecular weight" of the polymer B can be measured by a method described in the EXAMPLES section.

In the presently disclosed binder composition for a non-aqueous secondary battery electrode, when total content of the polymer A, the polymer B, and the polymer C is taken to be 100 mass %, the polymer A is preferably contained in a fraction a of not less than 5 mass % and not more than 60 mass %, the polymer B is preferably contained in a fraction b of not less than 0.1 mass % and not more than 50 mass %, and the polymer C is preferably contained in a fraction c of not less than 20 mass % and not more than 94 mass %. When the fractions in which the polymers A to C are contained are within the ranges set forth above, dispersibility of a conductive material and the like in a slurry composition for a non-aqueous secondary battery electrode that contains the binder composition can be increased. Moreover, the peel strength of an electrode mixed material layer that is obtained using the slurry composition can be further increased. Furthermore, battery characteristics such as cycle characteristics of a secondary battery that includes the electrode can be further enhanced.

In the presently disclosed binder composition for a non-aqueous secondary battery electrode, the fraction a and the fraction c preferably satisfy a relationship: $10 \leq a/(a+c) \times 100 \leq 50$. By adjusting the amounts of the polymer A and the polymer C so that the fraction a and the fraction c satisfy the relationship formula set forth above, the peel strength of an electrode mixed material layer obtained using a slurry composition for a non-aqueous secondary battery electrode that contains the binder composition can be further increased. Furthermore, battery characteristics such as cycle characteristics of a secondary battery that includes the electrode can be further enhanced.

In the presently disclosed binder composition for a non-aqueous secondary battery electrode, the polymers A to C are preferably polymers satisfying a condition that when an N-methyl-2-pyrrolidone mixture of 8 mass % in solid content concentration that contains the polymer A in the fraction a, the polymer B in the fraction b, and the polymer C in the fraction c as solid content is produced, a proportion of insoluble content in the mixture is not less than 30 mass % and not more than 80 mass %. When the amount of insoluble content with respect to N-methyl-2-pyrrolidone in the mixture of the polymers A to C is within the range set forth above, the peel strength of an electrode mixed material layer obtained using a slurry composition for a non-aqueous secondary battery electrode that contains the binder composition can be further increased. Moreover, battery characteristics such as cycle characteristics of a secondary battery that includes an obtained electrode can be further enhanced.

Note that the "proportion of insoluble content" can be measured by a method described in the EXAMPLES section.

Moreover, the present disclosure aims to advantageously solve the problems set forth above, and a presently disclosed slurry composition for a non-aqueous secondary battery electrode comprises: any one of the binder compositions for a non-aqueous secondary battery electrode set forth above; an electrode active material; and a conductive material, wherein the conductive material includes one or more carbon nanotubes. By compounding a binder composition for a non-aqueous secondary battery electrode that contains the polymer A set forth above, an electrode active material, and a conductive material that includes carbon nanotubes in this manner, the electrode active material and the carbon nanotubes (conductive material) can be well dispersed in a slurry composition. This makes it possible to sufficiently increase the solid content concentration of the slurry composition. Moreover, the peel strength of an obtained electrode mixed material layer can be sufficiently increased and battery characteristics of an obtained secondary battery can be enhanced through this slurry composition.

Furthermore, the present disclosure aims to advantageously solve the problems set forth above, and a presently disclosed method of producing a slurry composition for a non-aqueous secondary battery electrode comprises: a preliminary mixing step of mixing at least the carbon nanotubes, the polymer B, and the organic solvent to obtain a preliminary mixture; and a main mixing step of mixing the preliminary mixture with at least the polymer A and the polymer C. By mixing the carbon nanotubes and the polymer B in the preliminary mixing step and then implementing the main mixing step, dispersibility of the carbon nanotubes in the slurry composition can be further increased. Therefore, the presently disclosed method of producing a slurry composition enables efficient production of the presently disclosed slurry composition for a non-aqueous secondary battery electrode containing carbon nanotubes.

Also, the present disclosure aims to advantageously solve the problems set forth above, and a presently disclosed electrode for a non-aqueous secondary battery comprises an electrode mixed material layer formed using the slurry composition for a non-aqueous secondary battery electrode set forth above. An electrode mixed material layer that is formed using the slurry composition for a non-aqueous secondary battery electrode set forth above has high peel strength. Moreover, the electrode for a non-aqueous secondary battery including this electrode mixed material layer can sufficiently improve battery characteristics of a secondary battery.

Moreover, the present disclosure aims to advantageously solve the problems set forth above, and a presently disclosed non-aqueous secondary battery comprises the electrode for a non-aqueous secondary battery set forth above. By using the electrode for a non-aqueous secondary battery set forth above in this manner, it is possible to provide a non-aqueous secondary battery having excellent battery characteristics such as rate characteristics and cycle characteristics.

Advantageous Effect

According to the present disclosure, it is possible to provide a binder composition for a non-aqueous secondary battery electrode that can sufficiently increase the solid content concentration of an obtained slurry composition and the peel strength of an obtained electrode mixed material layer, and that can also enhance battery characteristics of a secondary battery including an obtained electrode.

Moreover, according to the present disclosure, it is possible to provide a slurry composition for a non-aqueous secondary battery electrode, and method of producing the same, that has a sufficiently high solid content concentration, that can sufficiently increase the peel strength of an obtained electrode mixed material layer, and that can enhance battery characteristics of an obtained secondary battery.

Furthermore, according to the present disclosure, it is possible to provide an electrode for a non-aqueous secondary battery that can sufficiently improve battery characteristics of a non-aqueous secondary battery and a non-aqueous secondary battery that has excellent battery characteristics such as rate characteristics and cycle characteristics.

DETAILED DESCRIPTION

The following provides a detailed description of embodiments of the present disclosure.

The presently disclosed binder composition for a non-aqueous secondary battery electrode can be used in production of a slurry composition for a non-aqueous secondary battery electrode. Moreover, a slurry composition for a non-aqueous secondary battery electrode produced using the presently disclosed binder composition for a non-aqueous secondary battery electrode can be used in formation of an electrode of a non-aqueous secondary battery such as a lithium ion secondary battery. Note that the presently disclosed slurry composition for a non-aqueous secondary battery electrode can be efficiently produced by the presently disclosed method of producing a slurry composition. Furthermore, a feature of the presently disclosed non-aqueous secondary battery is that an electrode for a non-aqueous secondary battery formed using the presently disclosed slurry composition for a non-aqueous secondary battery electrode is used therein.

Note that the presently disclosed binder composition for a non-aqueous secondary battery electrode and slurry composition for a non-aqueous secondary battery electrode are particularly suitable for use in formation of a positive electrode of a non-aqueous secondary battery.

(Binder Composition for Secondary Battery Electrode)

The presently disclosed binder composition for a non-aqueous secondary battery electrode is a binder composition for a non-aqueous secondary battery electrode that contains a polymer A, a polymer B, a polymer C, and an organic solvent. Features of the presently disclosed binder composition for a non-aqueous secondary battery electrode are that the polymer A is a particulate polymer including a (meth) acrylic acid ester monomer unit, the polymer B is a highly soluble polymer having an iodine value of not less than 5 g/100 g and not more than 100 g/100 g, and the polymer C includes a nitrile group-containing monomer unit in a proportion of not less than 70 mass % and not more than 98 mass % when all monomer units of the polymer C are taken to be 100 mass %, in total. The presently disclosed binder composition for a non-aqueous secondary battery electrode may also contain any other binder in addition to the polymers A to C as a binder.

The presently disclosed binder composition for a non-aqueous secondary battery electrode (hereinafter, also referred to simply as a "binder composition") can sufficiently increase the solid content concentration of an obtained slurry composition and the peel strength of an obtained electrode mixed material layer as a result of containing the polymers A to C satisfying the chemical composition and property conditions set forth above. Moreover, battery characteristics of a secondary battery including an obtained electrode can be enhanced through the presently disclosed binder composition. Although the reason for this is not clear, it is presumed to be as follows.

Firstly, the polymer A, which is a particulate polymer, can function to effectively adhere adhered components such as an electrode active material to one another in an electrode mixed material layer through point adhesion with the adhered components. Consequently, the polymer A can contribute to increasing the peel strength of a formed electrode mixed material layer. Moreover, in a situation in which a slurry composition is produced, the polymer B is adsorbed onto the surfaces of carbon nanotubes (hereinafter, also referred to simply as "CNTs") that are contained in the slurry composition as a conductive material, and can function to increase the dispersibility of the CNTs in the slurry composition. When the CNTs are well dispersed in the slurry composition, other solid content can also be well dispersed in the slurry composition as a result. Moreover, when dispersing ability of solid content is high, it is possible to increase the solid content concentration of the slurry composition. Furthermore, the polymer C can function to impart a suitable viscosity to a slurry composition in a situation in which a slurry composition is produced and can also function to inhibit degradation of an electrode active material accompanying repeated charging and discharging by thin-film coating the electrode active material in an electrode mixed material layer in a situation in which an electrode mixed material layer is formed using the slurry composition. Therefore, the polymer C can enhance cycle characteristics of a secondary battery. Accordingly, through inclusion of the polymers A to C, the presently disclosed binder composition can sufficiently increase the solid content concentration of an obtained slurry composition and the peel strength of an obtained electrode mixed material layer, and, as a result, can enhance battery characteristics of an obtained secondary battery in a situation in which a secondary battery is produced.

<Polymer A>

The polymer A is a component that, in an electrode produced by forming an electrode mixed material layer on a current collector using a slurry composition that contains the binder composition, holds components contained in the electrode mixed material layer so that these components do not become detached from the electrode mixed material layer (i.e., functions as a binder). Moreover, the polymer A is a component that is present in a particulate form in the organic solvent. Note that a method described in the EXAMPLES section can be used to confirm whether the polymer A has a "particulate form" in the organic solvent.

[Chemical Composition of Polymer A]

The polymer A is required to include a (meth)acrylic acid ester monomer unit as a repeating unit. In addition, the polymer A preferably includes an ethylenically unsaturated acid monomer unit as a repeating unit and can optionally include a cross-linkable monomer unit and monomer units other than those mentioned above as repeating units.

[(Meth)Acrylic Acid Ester Monomer Unit]

The (meth)acrylic acid ester monomer unit is a repeating unit that is derived from a (meth)acrylic acid ester monomer. As a result of the polymer A including the (meth)acrylic acid ester monomer unit, the peel strength of an obtained electrode mixed material layer can be increased, and rate characteristics of an obtained secondary battery can be improved.

The (meth)acrylic acid ester monomer may be a (meth)acrylic acid alkyl ester monomer in which the number of ethylenically unsaturated bonds is 1. Moreover, the (meth)acrylic acid alkyl ester monomer may be a (meth)acrylic acid alkyl ester monomer that includes a linear alkyl group or a (meth)acrylic acid alkyl ester monomer that includes a branched alkyl group. Examples of (meth)acrylic acid ester monomers include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, (meth)acrylic acid alkyl esters in which the alkyl group is a linear alkyl group are preferable from a viewpoint of imparting a suitable degree of affinity with electrolyte solution to an obtained electrode mixed material layer, and butyl acrylate and methyl methacrylate are more preferable. One of these (meth)acrylic acid ester monomers may be used individually, or two or more of these (meth)acrylic acid ester monomers may be used in combination.

The proportional content of the (meth)acrylic acid ester monomer unit in the polymer A when all repeating units included in the polymer A are taken to be 100.0 mass % is preferably 30.0 mass % or more, and more preferably 40.0 mass % or more, and is preferably 98.0 mass % or less, and more preferably 95.0 mass % or less. When the proportional content of the (meth)acrylic acid ester monomer unit in the polymer A is within any of the ranges set forth above, an obtained electrode mixed material layer can be provided with a suitable degree of affinity with electrolyte solution, and rate characteristics of a secondary battery including the electrode mixed material layer can be improved.

[Ethylenically Unsaturated Acid Monomer Unit]

The ethylenically unsaturated acid monomer unit is a repeating unit that is derived from an ethylenically unsaturated acid monomer. The polymer A can display excellent binding capacity as a result of including the ethylenically unsaturated acid monomer unit. Consequently, an electrode mixed material layer formed using a slurry composition that contains the presently disclosed binder composition can display even better peel strength. Note that the term "ethylenically unsaturated acid monomer unit" as used in the present specification refers to unit a monomer that includes an ethylenically unsaturated bond and an acidic group.

Examples of ethylenically unsaturated acid monomers that can form the ethylenically unsaturated acid monomer unit include monomers that include a carboxy group in addition to an ethylenically unsaturated bond, monomers that include a sulfo group in addition to an ethylenically unsaturated bond, and monomers that include a phosphate group in addition to an ethylenically unsaturated bond.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a carboxy group-containing monomer.

Examples of sulfo group-containing monomers include styrene sulfonic acid, vinyl sulfonic acid, methyl vinyl sulfonic acid, (meth)allyl sulfonic acid, 3-allyloxy-2-hydroxypropane sulfonic acid, and 2-acrylamido-2-methylpropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of these ethylenically unsaturated acid monomers may be used individually, or two or more of these ethylenically unsaturated acid monomers may be used in combination. Of these ethylenically unsaturated acid monomers, acrylic acid, methacrylic acid, itaconic acid, maleic acid, and fumaric acid are preferable from a viewpoint of further improving the peel strength of an obtained electrode mixed material layer, and acrylic acid and methacrylic acid are more preferable.

The proportional content of the ethylenically unsaturated acid monomer unit in the polymer A when all repeating units in the polymer A are taken to be 100.0 mass % is preferably 1.0 mass % or more, more preferably 1.5 mass % or more, even more preferably 2.0 mass % or more, and further preferably 3.0 mass % or more, and is preferably 10.0 mass % or less, more preferably 8.0 mass % or less, even more preferably 6.0 mass % or less, and further preferably 5.0 mass % or less. When the proportional content of the ethylenically unsaturated acid monomer unit is not less than any of the lower limits set forth above, the peel strength of an electrode mixed material layer formed using a slurry composition that contains the binder composition can be increased. In particular, when the proportional content of the ethylenically unsaturated acid monomer unit is not more than any of the upper limits set forth above, the flexibility of the polymer A can be improved, and, as a result, the peel strength of an obtained electrode mixed material layer can be further improved. High flexibility of the polymer A can also facilitate densification of electrode density in pressing of an electrode mixed material layer.

[Cross-Linkable Monomer Unit]

The cross-linkable monomer unit is a repeating unit that is derived from a cross-linkable monomer. The cross-linkable monomer is a monomer that can form a cross-linked structure when it is polymerized. When the polymer A includes the cross-linkable monomer unit, the peel strength of an obtained electrode mixed material layer can be further increased. Examples of cross-linkable monomers include monomers that include two or more reactive groups per one molecule.

More specifically, a polyfunctional ethylenically unsaturated carboxylic acid ester monomer that includes two or more ethylenically unsaturated bonds can be used as a cross-linkable monomer.

Examples of difunctional ethylenically unsaturated carboxylic acid ester monomers including two ethylenically unsaturated bonds in a molecule include allyl acrylate, allyl methacrylate, ethylene diacrylate, ethylene dimethacrylate, 2-hydroxy-3-acryloyloxypropyl methacrylate, polyethylene glycol diacrylate, propoxylated ethoxylated bisphenol A diacrylate, ethoxylated bisphenol A diacrylate, 9,9-bis[4-(2-acryloyloxyethoxy)phenyl]fluorene, propoxylated bisphenol A diacrylate, tricyclodecane dimethanol diacrylate, 1,10-decanediol diacrylate, 1,6-hexanediol diacrylate, 1,9-nonanediol diacrylate, polypropylene glycol diacrylate, polypropylene glycol dimethacrylate, polytetramethylene glycol diacrylate, ethylene glycol dimethacrylate, diethylene glycol dimethacrylate, polyethylene glycol dimethacrylate, ethoxylated bisphenol A dimethacrylate, tricyclodecane dimethanol dimethacrylate, 1,10-decanediol dimethacrylate, 1,6-hexanediol dimethacrylate, 1,9-nonanediol dimethacrylate, neopentyl glycol dimethacrylate, ethoxylated polypropylene glycol dimethacrylate, and glycerin dimethacrylate.

Examples of trifunctional ethylenically unsaturated carboxylic acid ester monomers including three ethylenically unsaturated bonds in a molecule include ethoxylated isocyanuric acid triacrylate, ε-caprolactone-modified tris(2-acryloxyethyl) isocyanurate, ethoxylated glycerin triacrylate, pentaerythritol triacrylate, trimethylolpropane triacrylate, and trimethylolpropane trimethacrylate.

Examples of ethylenically unsaturated carboxylic acid ester monomers having a functionality of four or higher that include four or more ethylenically unsaturated bonds in a molecule include di(trimethylolpropane) tetraacrylate, ethoxylated pentaerythritol tetraacrylate, pentaerythritol tetraacrylate, dipentaerythritol polyacrylate, and dipentaerythritol hexaacrylate.

Of these examples, allyl methacrylate (difunctional), ethylene glycol dimethacrylate (difunctional), trimethylolpropane triacrylate (trifunctional), and ethoxylated pentaerythritol tetraacrylate (tetrafunctional) are preferable from a viewpoint of improving the peel strength, flexibility, and so forth of an obtained electrode mixed material layer.

The proportional content of the cross-linkable monomer unit in the polymer A when all repeating units included in the polymer A are taken to be 100.0 mass % is preferably 0.01 mass % or more, more preferably 0.05 mass % or more, and even more preferably 0.1 mass % or more, and is preferably 5.0 mass % or less, more preferably 2.0 mass % or less, and even more preferably 1.5 mass % or less. When the proportional content of the cross-linkable monomer unit in the polymer A is not less than any of the lower limits set forth above, the peel strength of an obtained electrode mixed material layer can be further improved. Moreover, when the proportional content of the cross-linkable monomer unit in the polymer A is not more than any of the upper limits set forth above, the flexibility of an obtained electrode mixed material layer can be improved, and, as a result, the peel strength of the obtained electrode mixed material layer can be further improved.

[Other Monomer Units]

The polymer A may further include other monomer units derived from other monomers that are copolymerizable with the various types of monomers described above. Examples of other monomers that can form such other monomer units include known monomers that can be used in production of a binding component in a binder composition for an electrode of a non-aqueous secondary battery. More specific examples of other monomers include aromatic vinyl monomers described in detail in the "Polymer B" section and nitrile group-containing monomers and basic group-containing monomers described in detail in the "Polymer C" section. One of these other monomers may be used individually, or two or more of these other monomers may be used in combination.

The proportional content of other monomer units in the polymer A when all repeating units in the polymer A are taken to be 100.0 mass % is preferably 50.0 mass % or less, and may be 0.0 mass %.

[Amount of NMP-Insoluble Content]

When the polymer A is mixed in a concentration of 8 mass % with N-methyl-2-pyrrolidone, the amount of insoluble content is preferably 70 mass % or more, more preferably 80 mass % or more, even more preferably 90 mass % or more, and may be 100 mass % (i.e., the polymer A may be insoluble in N-methyl-2-pyrrolidone (hereinafter, also referred to simply as "NMP")). When the amount of NMP-insoluble content is not less than any of the lower limits set forth above, battery characteristics of a secondary battery including an obtained electrode mixed material layer can be further improved. Note that the amount of NMP-insoluble content can be controlled by adjusting the amount of a cross-linkable monomer in a monomer composition used to produce the polymer A. The amount of NMP-insoluble content in the polymer A can be measured by a method described in the EXAMPLES section.

[Production Method of Polymer A]

No specific limitations are placed on the method by which the polymer A set forth above is produced. The polymerization method in production of the polymer A is not specifically limited and may be a method such as solution polymerization, suspension polymerization, bulk polymerization, or emulsion polymerization. Moreover, ionic polymerization, radical polymerization, living radical polymerization, or the like may be adopted as the polymerization reaction. Examples of emulsifiers, dispersants, polymerization initiators, chain transfer agents, and the like that can be used in polymerization include the same as are typically used.

<Polymer B>

The polymer B is a component that can function to increase the dispersibility of a conductive material such as CNTs in a slurry composition in a situation in which a slurry composition is produced, and, as a result, makes it possible to increase the solid content concentration of the slurry composition. In addition, the polymer B is a component that can function as a binder with the polymer A in an electrode mixed material layer. Moreover, the polymer B is a component that is highly soluble in the organic solvent that is contained in the binder composition.

The iodine value of the polymer B is required to be not less than 5 g/100 g and not more than 100 g/100 g, and is preferably 10 g/100 g or more, and more preferably 20 g/100 g or more. When the iodine value of the polymer B is not less than any of the lower limits set forth above, the dispersibility of a conductive material such as CNTs can be sufficiently increased in a situation in which a slurry composition is produced, conductivity in an obtained electrode mixed material layer can be increased, and battery characteristics (particularly rate characteristics) of a secondary battery including the electrode mixed material layer can be enhanced. Moreover, when the iodine value of the polymer B is not more than the upper limit set forth above, excessive swelling of a formed electrode mixed material layer in electrolyte solution can be inhibited, and battery characteristics (particularly rate characteristics) can be enhanced.

The weight-average molecular weight of the polymer B is preferably 5,000 or more, more preferably 15,000 or more, and even more preferably 30,000 or more, and is preferably 500,000 or less, more preferably 400,000 or less, and even more preferably 300,000 or less. When the weight-average molecular weight of the polymer B is not less than any of the lower limits set forth above, sedimentation of a conductive material, such as CNTs, and an electrode active material can be inhibited in a situation in which a slurry composition is produced. As a result, the peel strength of an obtained electrode mixed material layer can be increased. Moreover, when the weight-average molecular weight of the polymer B is not more than any of the upper limits set forth above, it is possible to suppress increased viscosity and reduced dispersibility in a situation in which a slurry composition is produced, and the solid content concentration of the slurry composition can be increased more easily. Consequently, rate characteristics and cycle characteristics of an obtained secondary battery can be enhanced.

The polymer B can have any chemical composition without any specific limitations so long as it can satisfy the iodine value range set forth above. In particular, the polymer B preferably includes an aromatic vinyl monomer unit, a nitrile group-containing monomer unit, an ethylenically unsaturated acid monomer unit, and a linear alkylene structural unit having a carbon number of 4 or more.

Examples of monomers that can be used to form the aromatic vinyl monomer unit include aromatic vinyl monomers such as styrene, α-methylstyrene, butoxystyrene, vinyltoluene, and vinylnaphthalene. Note that the aromatic vinyl monomer does not include an acidic group. One of these aromatic vinyl monomers may be used individually, or two or more of these aromatic vinyl monomers may be used in combination. Of these aromatic vinyl monomers, styrene is preferable from a viewpoint of having good copolymerizability. The proportional content of the aromatic vinyl monomer unit in the polymer B when all repeating units in the polymer B (total of structural units and monomer units) are taken to be 100 mass % is preferably 30 mass % or more, more preferably 35 mass % or more, and even more preferably 40 mass % or more, and is preferably 55 mass % or less, more preferably 50 mass % or less, and even more preferably 45 mass % or less.

Examples of monomers that can be used to form the nitrile group-containing monomer unit include α,β-ethylenically unsaturated nitrile monomers. Specific examples of α,β-ethylenically unsaturated nitrile monomers include acrylonitrile; α-halogenoacrylonitriles such as α-chloroacrylonitrile and α-bromoacrylonitrile; and α-alkylacrylonitriles such as methacrylonitrile and α-ethylacrylonitrile. One of these α,β-ethylenically unsaturated nitrile monomers may be used individually, or two or more of these α,β-ethylenically unsaturated nitrile monomers may be used in combination. Of these α,β-ethylenically unsaturated nitrile monomers, acrylonitrile and methacrylonitrile are preferable from a viewpoint of increasing the binding capacity that can be displayed by the polymer B, with acrylonitrile being more preferable. One of these monomers may be used individually, or two or more of these monomers may be used in combination. The proportional content of the nitrile group-containing monomer unit in the polymer B when all repeating units are taken to be 100 mass % is preferably 10 mass % or more, more preferably 13 mass % or more, and even more preferably 18 mass % or more, and is preferably 40 mass % or less, more preferably 33 mass % or less, and even more preferably 28 mass % or less.

Examples of monomers that can be used to form the ethylenically unsaturated acid monomer unit include the same monomers as the various monomers listed in the "Ethylenically unsaturated acid monomer unit" section of "Polymer A". Of these monomers, acrylic acid and methacrylic acid are preferable because they can efficiently trap transition metal ions that elute particularly from a positive electrode active material, and methacrylic acid is more preferable. The proportional content of the ethylenically unsaturated acid monomer unit in the highly soluble polymer B when all repeating units are taken to be 100 mass % is preferably 0.1 mass % or more, and more preferably 1 mass % or more, and is preferably 10 mass % or less, and more preferably 6 mass % or less.

The linear alkylene structural unit having a carbon number of 4 or more (hereinafter, also referred to simply as an "alkylene structural unit") is a repeating unit that is composed of only a linear alkylene structure having a carbon number of 4 or more that is represented by a general formula: $-C_nH_{2n}-$ (n is an integer of 4 or more). The method by which the linear alkylene structural unit having a carbon number of 4 or more is introduced into the polymer B is not specifically limited and may be either of the following methods (1) or (2), for example.

(1) A method in which a polymer is produced from a monomer composition containing a conjugated diene monomer and then the polymer is hydrogenated to convert a conjugated diene monomer unit to a linear alkylene structural unit having a carbon number of 4 or more (2) A method in which a polymer is produced from a monomer composition containing a 1-olefin monomer having a carbon number of 4 or more such as 1-butene or 1-hexene The conjugated diene monomer or 1-olefin monomer may be one type used individually, or may be two or more types used in combination.

Of these methods, method (1) is preferable in terms of ease of production of the polymer.

Examples of conjugated diene monomers that can be used in method (1) include conjugated diene compounds having a carbon number of 4 or more such as 1,3-butadiene, isoprene, 2,3-dimethyl-1,3-butadiene, and 1,3-pentadiene. One of these conjugated diene monomers may be used individually, or two or more of these conjugated diene monomers may be used in combination. Of these conjugated diene monomers, 1,3-butadiene is preferable. In other words, the linear alkylene structural unit having a carbon number of 4 or more is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e., the alkylene structural unit is more preferably a hydrogenated 1,3-butadiene unit). Selective hydrogenation of a conjugated diene monomer unit can be carried out by a commonly known method such as an oil-layer hydrogenation method or a water-layer hydrogenation method.

The polymer B can be produced by, for example, polymerizing a monomer composition containing the monomers described above to obtain a copolymer, and then hydrogenating the obtained copolymer as necessary, but is not specifically limited to being produced in this manner.

The proportional content of the linear alkylene structural unit having a carbon number of 4 or more in the polymer B when all repeating units are taken to be 100 mass % is preferably 15 mass % or more, more preferably 20 mass % or more, and even more preferably 25 mass % or more, and is preferably 50 mass % or less, more preferably 45 mass % or less, and even more preferably 40 mass % or less.

Note that in a case in which the linear alkylene structural unit having a carbon number of 4 or more that is included in the polymer B is formed by a method in which a polymer is produced from a monomer composition containing a conjugated diene monomer and then the polymer is hydrogenated, it is preferable that the total proportion content of the linear alkylene structural unit having a carbon number of 4 or more that is included in the polymer B and a conjugated diene monomer unit that remains in the polymer B without being hydrogenated satisfies any of the ranges set forth above.

<Polymer C>

The polymer C is a component that can impart a suitable viscosity to a slurry composition in a situation in which a slurry composition is produced. In addition, the polymer C is a component that can function as a binder with the polymers A and B in an electrode mixed material layer. Moreover, the polymer C is a component that is highly soluble in the organic solvent that is contained in the binder composition.

The polymer C is required to include a nitrile group-containing monomer unit in a proportion of not less than 70.0 mass % and not more than 98.0 mass % when all repeating units included in the polymer C are taken to be 100 mass % as previously described. The polymer C preferably includes the nitrile group-containing monomer unit in a proportion of 80.0 mass % or more, and more preferably 80.0 mass % or more, and preferably includes the nitrile group-containing monomer unit in a proportion of 98.0 mass % or less, and more preferably 95.0 mass % or less. When the proportion in which the nitrile group-containing monomer unit is included in the polymer C is not less than any of the lower limits set forth above, the polymer C is readily adsorbed by an electrode active material in a situation in which a slurry composition is produced, and enables good thin-film coating of the electrode active material. Consequently, cycle characteristics of an obtained secondary battery can be enhanced. Moreover, when the proportion in which the nitrile group-containing monomer unit is included in the polymer C is not more than any of the upper limits set forth above, excessive reduction of solubility of the polymer C in the organic solvent can be inhibited, precipitation of the polymer C in a slurry composition can be inhibited, and thus the solid content concentration of the slurry composition can be well increased. As a result, the slurry composition can contain an electrode active material, a conductive material, and the like in high concentrations, and rate characteristics and cycle characteristics of an obtained secondary battery can be enhanced.

Examples of nitrile group-containing monomers that can be used to form the nitrile group-containing monomer unit include the same monomers as the various monomers listed in the "Polymer B" section. One of these nitrile group-containing monomers may be used individually, or two or more of these nitrile group-containing monomers may be used in combination. Of these nitrile group-containing monomers, acrylonitrile and methacrylonitrile are preferable. One of these monomers may be used individually, or two or more of these monomers may be used in combination.

In addition to the nitrile group-containing monomer unit, the polymer C may include other monomer units such as a basic group-containing monomer unit, an ethylenically unsaturated acid monomer unit, and a (meth)acrylic acid ester monomer unit.

The basic group-containing monomer unit can be formed using a basic group-containing monomer. Examples of basic group-containing monomers include, but are not specifically limited to, amino group-containing monomers such as dimethylaminoethyl (meth)acrylate, diethylaminoethyl (meth)acrylate, aminoethyl vinyl ether, and dimethylaminoethyl vinyl ether; and amide group-containing monomers such as N-vinylacetamide, (meth)acrylamide, N-methylol (meth)acrylamide, dimethyl (meth)acrylamide, diethyl (meth)acrylamide, N-methoxymethyl (meth)acrylamide, and dimethylaminopropyl (meth)acrylamide. The proportional content of the basic group-containing monomer unit in the polymer C when all repeating units are taken to be 100 mass % is preferably 0.5 mass % or more, and more preferably 1.0 mass % or more, and is preferably 5 mass % or less, and more preferably 1.5 mass % or less.

The ethylenically unsaturated acid monomer unit and the (meth)acrylic acid ester monomer unit can be formed using the same monomers as the various monomers listed in the "Ethylenically unsaturated acid monomer unit" section and the "(Meth)acrylic acid ester monomer unit" section of "Polymer A". The proportional content of the ethylenically unsaturated acid monomer unit in the polymer C when all repeating units are taken to be 100 mass % is, for example, preferably 0.1 mass % or more, and more preferably 1 mass % or more, and is preferably 10 mass % or less, and more preferably 5 mass % or less. The proportional content of the (meth)acrylic acid ester monomer unit in the polymer C when all repeating units are taken to be 100 mass % is preferably 1 mass % or more and more preferably 20 mass % or less, and is preferably 1 mass % or more and more preferably 10 mass % or less.

The polymer C can be produced according to a known method such as described in the "Production method of polymer A" section, for example, without any specific limitations.

<Fractions of Polymers a to C>

When the total content in the binder composition of the polymers A to C satisfying the properties and/or chemical compositions set forth above is taken to be 100 mass %, the fractions in which the polymers A to C are contained are preferably within the following ranges.

Firstly, a fraction a in which the previously described polymer A is contained is preferably 5 mass % or more, and more preferably 10 mass % or more, and is preferably 60 mass % or less, more preferably 50 mass % or less, even more preferably 40 mass % or less, and particularly preferably 30 mass % or less. When the fraction a in which the polymer A is contained is not less than any of the lower limits set forth above, the peel strength of an electrode mixed material layer formed using the binder composition can be sufficiently increased. Moreover, when the fraction a in which the polymer A is contained is not more than any of the upper limits set forth above, sedimentation of the polymer A can be inhibited in a situation in which a slurry composition is produced, and, as a result, reduction of peel strength of an obtained electrode mixed material layer can be inhibited. Furthermore, battery characteristics of an obtained secondary battery can be enhanced.

A fraction b in which the previously described polymer B is contained is preferably 0.1 mass % or more, and more preferably 1 mass % or more, and is preferably 50 mass % or less, more preferably 30 mass % or less, even more preferably 25 mass % or less, and particularly preferably 20 mass % or less. When the fraction b in which the polymer B is contained is not less than any of the lower limits set forth above, the dispersibility of CNTs serving as a conductive material can be increased in a situation in which a slurry composition is produced, which makes it possible to increase the solid content concentration of the slurry composition. As a result, the initial capacity, rate characteristics, and so forth of a secondary battery can be enhanced. Moreover, when the fraction b in which the polymer B is contained is not more than any of the upper limits set forth above, it is possible to inhibit sedimentation from occurring more easily in a situation in which a slurry composition is produced. As a result, the peel strength of an obtained electrode mixed material layer can be increased, and battery characteristics of an obtained secondary battery can be improved.

A fraction c in which the previously described polymer C is contained is preferably 20 mass % or more, more preferably 30 mass % or more, even more preferably 35 mass % or more, and further preferably 40 mass % or more, and is preferably 94 mass % or less. When the fraction c in which the polymer C is contained is not less than any of the lower limits set forth above, it is possible to inhibit sedimentation from occurring more easily in a situation in which a slurry composition is produced. As a result, the peel strength of an obtained electrode mixed material layer can be increased, and battery characteristics of an obtained secondary battery can be improved. Moreover, when the fraction c in which the polymer C is contained is not more than the upper limit set forth above, the solid content concentration of a slurry composition can be increased.

<Relationships Between Fractions a to c>

The fraction a of the polymer A and the fraction b of the polymer B are preferably such that a value for the proportion (%) constituted by the polymer A among the total fraction in which the polymers A and B are contained, which is represented by a formula $a/(a+b) \times 100$, satisfies $20 \leq a/(a+b) \times 100 \leq 90$, and more preferably satisfies $25 \leq a/(a+b) \times 100 \leq 90$. When the value of the formula $a/(a+b) \times 100$ is 20 or more, the peel strength of an obtained electrode mixed material layer can be further increased. Moreover, when the value of the formula $a/(a+b) \times 100$ is 90 or less, it is possible to sufficiently increase the solid content concentration in a situation in which a slurry composition is produced. As a result, rate characteristics of an obtained secondary battery can be further enhanced.

The fraction a of the polymer A and the fraction c of the polymer C are preferably such that a value for the proportion (%) constituted by the polymer A among the total fraction in which the polymers A and C are contained, which is represented by a formula $a/(a+c) \times 100$, satisfies $10 \leq a/(a+c) \times 100 \leq 50$, more preferably satisfies $10 \leq a/(a+c) \times 100 \leq 40$, and even more preferably satisfies $10 \leq a/(a+c) \times 100 \leq 35$. When the value of the formula $a/(a+c) \times 100$ is 10 or more, point adhesion of adhered components through the polymer A occurs with sufficient frequency, and the peel strength of an obtained electrode mixed material layer can be further increased. Moreover, when the value of the formula $a/(a+c) \times 100$ is 50 or less, cycle characteristics of an obtained secondary battery can be further enhanced due to thin-film coating of an electrode active material by the polymer C.

<NMP Solubility of Polymers A to C>

The polymers A to C set forth above are preferably polymers satisfying a condition that when an N-methyl-2-pyrrolidone mixture of 8 mass % in solid content concentration that contains the polymer A in the fraction a, the polymer B in the fraction b, and the polymer C in the fraction c as solid content is produced, the proportion of insoluble content in the mixture is not less than 30 mass % and not more than 80 mass %. The polymers A to C are more preferably polymers for which the proportion of insoluble content described above is not less than 35 mass % and not more than 75 mass %. When the proportion of insoluble content described above is 30 mass % or more, the peel strength of an obtained electrode mixed material layer can be further increased. Moreover, when the proportion of insoluble content described above is 80 mass % or less, it is possible to inhibit an excessive increase of viscosity of a slurry composition and to sufficiently increase the solid content concentration of the slurry composition in a situation in which a slurry composition is produced. As a result, rate characteristics and cycle characteristics of an obtained secondary battery can be enhanced.

<Other Binders>

Besides the polymers A to C set forth above, the presently disclosed binder composition may contain other binders differing from the polymers A to C. Examples of such binders include fluoropolymer-based binders such as polyvinylidene fluoride, polyvinyl acetate-based binders, polyacrylic acid-based binders, and polyvinyl alcohol-based binders. In a case in which the presently disclosed binder composition contains another binder, the proportional content of the other binder when the mass of all binders contained in the binder composition is taken to be 100 mass % is preferably less than 50 mass %, more preferably 40 mass % or less, even more preferably 30 mass % or less, and may be 0 mass % (i.e., the presently disclosed binder composition may contain only the polymers A to C set forth above as binders).

<Organic Solvent>

Examples of the organic solvent of the presently disclosed binder composition include alcohols such as methanol, ethanol, n-propanol, isopropanol, n-butanol, isobutanol, t-butanol, pentanol, hexanol, heptanol, octanol, nonanol, decanol, and amyl alcohol, ketones such as acetone, methyl ethyl ketone, and cyclohexanone, esters such as ethyl acetate and butyl acetate, ethers such as diethyl ether, dioxane, and tetrahydrofuran, amide polar organic solvents such as N,N-dimethylformamide and N-methyl-2-pyrrolidone (NMP), and aromatic hydrocarbons such as toluene, xylene, chlorobenzene, ortho-dichlorobenzene, and para-dichlorobenzene. One of these organic solvents may be used individually, or two or more of these organic solvents may be used as a mixture.

Of these examples, NMP is preferable as the organic solvent.

<Other Components>

Other than the components set forth above, the presently disclosed binder composition may contain components such as a reinforcing material, a leveling agent, a viscosity modifier, and an additive for electrolyte solution. These other components are not specifically limited so long as they do not affect battery reactions and may be selected from commonly known components such as those described in WO2012/115096A1. One of these components may be used individually, or two or more of these components may be used in combination in a freely selected ratio.

<Production of Binder Composition>

The presently disclosed binder composition can be produced by mixing the above-described polymers A to C as binders, the organic solvent, and the other optional components by a known method. Specifically, the binder composition can be produced by mixing the above-described components using a mixer such as a ball mill, a sand mill, a bead mill, a pigment disperser, a grinding machine, an ultrasonic disperser, a homogenizer, a planetary mixer, or a FILMIX. Although no specific limitations are placed on the solid content concentration of the binder composition, the solid content concentration can be not less than 5 mass % and not more than 60 mass %, for example.

(Slurry Composition for Non-Aqueous Secondary Battery Electrode)

The presently disclosed slurry composition for a non-aqueous secondary battery electrode contains an electrode active material, a conductive material including one or more carbon nanotubes, and the binder composition set forth above, and optionally further contains other components. In other words, the presently disclosed slurry composition contains an electrode active material, carbon nanotubes, the previously described polymers A to C, and an organic solvent, and optionally further contains other components. As a result of the presently disclosed slurry composition containing the binder composition set forth above, the presently disclosed slurry composition has a sufficiently high solid content concentration and can form an electrode mixed material layer having high peel strength. Therefore, a secondary battery can be caused to display excellent battery characteristics through the presently disclosed slurry composition.

Although the following describes, as one example, a case in which the slurry composition for a secondary battery electrode is a slurry composition for a lithium ion secondary battery positive electrode, the presently disclosed slurry composition for a secondary battery electrode is not limited to the following example.

<Electrode Active Material>

The electrode active material is a material that gives and receives electrons in an electrode of a secondary battery. A material that can occlude and release lithium is normally used as a positive electrode active material for a lithium ion secondary battery.

Specific examples of positive electrode active materials for lithium ion secondary batteries include, without any specific limitations, known positive electrode active materials such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(Co\ Mn\ Ni)O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, lithium-rich spinel compounds represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$.

The particle diameter of the positive electrode active material is not specifically limited and may be the same as that of a conventionally used positive electrode active material. The proportional content of the positive electrode active material in the slurry composition can be not less than 90 mass % and not more than 99 mass %, for example, when all solid content in the slurry composition is taken to be 100 mass %.

<Conductive Material>

The conductive material ensures electrical contact amongst the electrode active material. The presently disclosed slurry composition preferably contains CNTs, which are a fibrous carbon material, as the conductive material. This is because CNTs can be well dispersed in the slurry composition through the presently disclosed binder composition set forth above and, as a result, the dispersibility of other solid content in the slurry composition, such as the electrode active material, can also be increased. Single-walled carbon nanotubes or multi-walled carbon nanotubes (multi-walled carbon nanotubes are inclusive of cup-stacked carbon nanotubes) can be used as the CNTs. The specific surface area of the CNTs is preferably 50 $m^2/g$ or more, more preferably 70 $m^2/g$ or more, and even more preferably 100 $m^2/g$ or more, and is preferably 400 $m^2/g$ or less, more preferably 350 $m^2/g$ or less, and even more preferably 300 $m^2/g$ or less. When the specific surface area of the CNTs is within any of the ranges set forth above, good dispersibility of the CNTs in the slurry composition can be ensured, and the viscosity of the slurry composition can be stabilized. Note that in the present disclosure, "specific surface area" refers to nitrogen adsorption specific surface area measured by the BET method.

Examples of conductive materials other than CNTs that may be used include conductive carbon materials such as carbon black (for example, acetylene black, Ketjenblack® (Ketjenblack is a registered trademark in Japan, other countries, or both), and furnace black), carbon nanohorns, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals. One of these conductive materials may be used individually, or two or more of these conductive materials may be used in combination. The particle diameter of the conductive material is not specifically limited and may be the same as that of a conventionally used conductive material. The proportional content of the conductive material in the slurry composition can be not less than 0.1 mass % and not more than 3 mass %, for example, when all solid content in the slurry composition is taken to be 100 mass %.

<Binder Composition>

The presently disclosed binder composition for a non-aqueous secondary battery electrode set forth above is used as the binder composition. Note that the proportional content of the binder composition in the slurry composition can be not less than 0.1 mass % and not more than 5 mass %, for example, when all solid content in the slurry composition is taken to be 100 mass %.

<Other Components>

Examples of other components that may be contained in the slurry composition include, but are not specifically limited to, the same other components as may be contained in the presently disclosed binder composition. One other component may be used individually, or two or more other components may be used in combination in a freely selected ratio.

<Production Method of Slurry Composition>

The slurry composition set forth above can be produced by dissolving or dispersing the above-described components in the organic solvent. More specifically, the production method of the presently disclosed slurry composition set forth above preferably includes a preliminary mixing step of mixing at least the CNTs (conductive material), the previously described polymer B, and the organic solvent to obtain a preliminary mixture and a main mixing step of mixing the obtained preliminary mixture with at least the polymer A and the polymer C. By implementing the main mixing step after mixing the CNTs and the polymer B in the preliminary mixing step in this manner, the dispersibility of the CNTs in the slurry composition can be further increased.

[Preliminary Mixing Step]

In the preliminary mixing step, at least the CNTs, the polymer B, and the organic solvent are mixed to obtain a preliminary mixture. The mixing method is not specifically limited and may be a mixing method in which a mixer such as a ball mill, a sand mill, a bead mill, a pigment disperser, a grinding machine, an ultrasonic disperser, a homogenizer, a planetary mixer, or a FILMIX is used. The stirring conditions in the preliminary mixing step are preferably stirring conditions that can cause stronger stirring force than stirring conditions in the subsequent main mixing step. By mixing the CNTs and the polymer B through stirring with strong stirring force in the preliminary mixing step, aggregation of the CNTs in the slurry composition can be effectively inhibited. Other polymers besides the polymer B may be compounded during the preliminary mixing step. In a case in which other polymers (i.e., the polymers A and C, and other polymers) besides the polymer B are compounded in the preliminary mixing step, the additive amount thereof is preferably ½ or less of the total additive amount (by mass) of the other polymers. By causing adsorption of the polymer B by the CNTs to occur in advance of adding other polymers, the dispersibility of the CNTs in the obtained slurry composition can be effectively increased. Note that in a case in which a component other than the CNTs is compounded as a conductive material, this component may be compounded in the preliminary mixing step.

The organic solvent can be any of the organic solvents that can be contained in the presently disclosed binder composition. Moreover, the organic solvent contained in the binder composition may serve as the organic solvent used in the preliminary mixing step.

The ratio of the CNTs and the polymer B in the preliminary mixing step is, for example, preferably not less than 0.01 parts by mass and not more than 0.5 parts by mass of the polymer B (in terms of solid content) relative to 1.0 parts by mass of the CNTs. When the ratio of the CNTs and the polymer B in the preliminary mixing step is within the range set forth above, a better balance of increasing the solid content concentration of the slurry composition and enhancing rate characteristics of an obtained secondary battery can be achieved.

[Main Mixing Step]

In the main mixing step, the preliminary mixture obtained in the preliminary mixing step is mixed with at least the polymers A and C. Note that in addition to the polymers A and C, the electrode active material and other optional components described above may be compounded in the main mixing step. Moreover, the organic solvent may be further added in the main mixing step to optimize the mixing conditions. Of course, it is also possible to add the electrode active material at a later stage than the main mixing step rather than in the main mixing step.

The total additive amount of each component added in the production method of the slurry composition is as described in detail in the "Binder composition for non-aqueous secondary battery electrode" section and the "Slurry composition for non-aqueous secondary battery electrode" section.

(Electrode for Non-Aqueous Secondary Battery)

The presently disclosed electrode for a non-aqueous secondary battery includes a current collector and an electrode mixed material layer formed on the current collector. The electrode mixed material layer is formed using the slurry composition set forth above. In other words, the electrode mixed material layer contains at least an electrode active material, one or more carbon nanotubes, and polymers derived from the polymers A to C, and optionally contains other components. It should be noted that components contained in the electrode mixed material layer are components that are contained in the previously described slurry composition. Furthermore, the preferred ratio of these components in the electrode mixed material layer is the same as the preferred ratio of these components in the slurry composition. Also note that the "polymer derived from the polymer A" may maintain a particulate form in the electrode mixed material layer or may have another form without maintaining a particulate form. Moreover, the polymer derived from the polymer B is preferably present adjacently to the CNTs. Furthermore, the polymer derived from the polymer C is preferably present covering at least part of the surface of a solid component such as the electrode active material.

The presently disclosed electrode for a non-aqueous secondary battery has high peel strength as a result of being formed using a slurry composition that contains the presently disclosed binder composition. Consequently, a secondary battery having excellent battery characteristics such as rate characteristics and cycle characteristics is obtained by using this electrode.

<Production Method of Electrode>

The presently disclosed electrode for a non-aqueous secondary battery can be produced, for example, through a step of applying the above-described slurry composition onto the current collector (application step) and a step of drying the slurry composition that has been applied onto the current collector to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. One of these materials may be used individually, or two or more of these materials may be used in combination in a freely selected ratio.

[Drying Step]

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector to thereby obtain an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

(Non-Aqueous Secondary Battery)

The presently disclosed non-aqueous secondary battery includes the presently disclosed electrode for a non-aqueous secondary battery. More specifically, the presently disclosed non-aqueous secondary battery includes a positive electrode, a negative electrode, an electrolyte solution, and a separator, and has the presently disclosed electrode for a non-aqueous secondary battery as at least one of the positive electrode and the negative electrode. The presently disclosed non-aqueous secondary battery has excellent battery characteristics such as rate characteristics and cycle characteristics as a result of including the presently disclosed electrode for a non-aqueous secondary battery.

Note that it is preferable that the presently disclosed non-aqueous secondary battery is a non-aqueous secondary battery having the presently disclosed electrode for a non-aqueous secondary battery as a positive electrode. Although the following describes, as one example, a case in which the secondary battery is a lithium ion secondary battery, the presently disclosed secondary battery is not limited to the following example.

<Electrodes>

Examples of electrodes other than the electrode for a non-aqueous secondary battery set forth above that can be used in the presently disclosed non-aqueous secondary battery include known electrodes used in production of non-aqueous secondary batteries without any specific limitations. Specifically, an electrode obtained by forming an electrode mixed material layer on a current collector by a known production method may be used as an electrode other than the electrode for a non-aqueous secondary battery set forth above.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferred for their high dielectric constant and broad stable potential region, and a mixture of ethylene carbonate and diethyl carbonate is more preferable.

The concentration of the electrolyte in the electrolyte solution may be adjusted as appropriate. Moreover, known additives such as vinylene carbonate may be added to the electrolyte solution.

<Separator>

The separator may be a separator such as described in JP2012-204303A, for example, but is not specifically limited thereto. Of these separators, a microporous membrane made of polyolefinic (polyethylene, polypropylene, polybutene, or polyvinyl chloride) resin is preferred since such a membrane can reduce the total thickness of the separator, which increases the proportion of electrode active material in the secondary battery, and consequently increases the volumetric capacity of the secondary battery.

<Production Method of Non-Aqueous Secondary Battery>

The presently disclosed non-aqueous secondary battery can be produced by, for example, stacking the positive electrode and the negative electrode with the separator in-between, performing rolling, folding, or the like of the resultant laminate as necessary in accordance with the battery shape, placing the laminate in a battery container, injecting the electrolyte solution into the battery container, and sealing the battery container. In order to prevent pressure increase inside the secondary battery and occurrence of overcharging or overdischarging, an overcurrent preventing device such as a PTC device or a fuse; an expanded metal;

or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the NMP solubility of a polymer A, the NMP solubility of polymers B and C, the iodine value and weight-average molecular weight of a polymer B, the proportion of NMP-insoluble content in a mixture of polymers A to C, and the solid content concentration of a slurry composition were measured or confirmed as described below. In addition, the peel strength of an electrode mixed material layer, and the initial capacity, rate characteristics, and cycle characteristics of a secondary battery in the examples and comparative examples were evaluated as described below.

<NMP Solubility of Polymer A>

Each polymer A produced in the examples and comparative examples was vacuum dried in a 25° C. environment for 24 hours to obtain a dry polymer (mass: W1 g). The obtained dry polymer was left in 60° C. NMP for 72 hours, and then insoluble content was separated by filtration through 200 mesh. The insoluble content was washed with methanol and was then dried in a 25° C. environment for 24 hours to obtain dry insoluble content (mass: W2 g). The amount of NMP-insoluble content in the polymer A (=W2/W1×100 (mass %)) was calculated from W1 and W2. Note that the amount of NMP-insoluble content was confirmed to be 70 mass % or more for every polymer A produced in the examples and comparative examples.

<NMP Solubility of Polymers B and C>

The NMP solubility of polymers B and C was confirmed by the following procedure.

A composition containing a polymer in N-methyl-2-pyrrolidone (NMP) that was produced in the examples and comparative examples was added dropwise, in an amount of 25 g, to 1 L of methanol so as to cause precipitation of the polymer. The precipitated polymer was vacuum dried in a 25° C. environment for 24 hours to obtain a dry polymer (mass: W1 g). The obtained dry polymer was left in 60° C. NMP for 72 hours, and then insoluble content was separated by filtration through 200 mesh. The insoluble content was washed with methanol and was then dried in a 25° C. environment for 24 hours to obtain dry insoluble content (mass: W2 g). The amount of NMP-insoluble content in the polymer (=W2/W1×100 (mass %)) was calculated from W1 and W2. Note that the amount of NMP-insoluble content was confirmed to be 50 mass % or less for every polymer B and C produced in the examples and comparative examples.

<Iodine Value of Polymer B>

For each water dispersion of a polymer B (water dispersion before solvent replacement with NMP) produced in the examples and comparative examples, 100 g thereof was coagulated in 1 L of methanol and was then vacuum dried at a temperature of 60° C. for 12 hours. The iodine value of the dry highly soluble polymer B that was obtained was then measured in accordance with JIS K6235(2006).

<Weight-Average Molecular Weight of Polymer B>

The weight-average molecular weight of each polymer B produced in the examples and comparative examples was measured by gel permeation chromatography (GPC). Specifically, a calibration curve for a standard substance was prepared using polystyrene so as to calculate the weight-average molecular weight as a standard substance-equivalent value. Note that the measurement conditions were as follows.

<<Measurement Conditions>>
Measurement Apparatus
   Column: TSKgel α-M×2 (7.8 mm I.D.×30 cm×2 columns; produced by Tosoh Corporation)
Measurement Conditions
   Eluent: Dimethylformamide (50 mM lithium bromide, 10 mM phosphoric acid)
   Flow rate: 0.5 mL/min
   Sample concentration: Approximately 0.5 g/L (solid content concentration)
   Injection volume: 200 μL
   Column temperature: 40° C.
   Detector: Differential refractive index detector RI (HLC-8320 GPC RI detector produced by Tosoh Corporation)
   Detector conditions: RI: Pol (+), Res (1.0 s)
   Molecular weight marker: Standard polystyrene kit PStQuick K produced by Tosoh Corporation <Proportion of NMP-Insoluble Content in Mixture of Polymers A to C>

In an environment having a temperature of 25° C., polymers A to C produced or prepared in each of the examples and comparative examples were added to NMP solvent in the mixing ratio described in the example such as to have a solid content concentration of 8% in order to produce 100 g of an NMP mixture of the polymers A to C. The produced mixture was filtered through an 80-mesh wire screen, the filtration residue was weighed, and the mass of insoluble content was calculated as a proportion (mass %) relative to the total added amount of solid content.

<Solid Content Concentration of Slurry Composition>

The same steps as the steps in "Production of slurry composition for positive electrode" of each of the examples and comparative examples were implemented and, in the main mixing step, N-methylpyrrolidone (NMP) was added such that the slurry viscosity as measured by a B-type viscometer (rotation speed: 60 rpm) at 23° C. was 3,500 mPa·s. The concentration of solids in the obtained slurry composition for a positive electrode was evaluated by the following standard.
   A: 78% or more
   B: Not less than 75% and less than 78%
   C: Not less than 72% and less than 75%
   D: Less than 72%

<Peel Strength of Electrode Mixed Material Layer>

A positive electrode for a lithium ion secondary battery produced in each of the examples and comparative examples was cut out as a rectangle of 100 mm in length and 10 mm in width to obtain a test specimen. The test specimen was placed with the surface at which the positive electrode mixed material layer was located facing downward, cellophane tape (tape in accordance with JIS Z1522) was affixed to the surface of the positive electrode mixed material layer, and the stress was measured when the current collector was peeled off by pulling one end of the current collector in a perpendicular direction at a speed of 100 mm/min. (Note that the cellophane tape was secured to a test stage.) This measurement was performed three times to obtain an average value. The average value was taken to be the peel strength and was evaluated by the following standard. A larger value for the peel strength indicates stronger close adherence between the positive electrode mixed material layer and the current collector and higher peel strength of the electrode (positive electrode) mixed material layer.

A: Peel strength of 30 N/m or more
B: Peel strength of not less than 25 N/m and less than 30 N/m
C: Peel strength of not less than 20 N/m and less than 25 N/m
D: Peel strength of less than 20 N/m <Initial Capacity of Secondary Battery>

A lithium ion secondary battery produced in each of the examples and comparative examples was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was then discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage: 4.20 V) and CC discharging of the lithium ion secondary battery was performed to a cell voltage of 3.00 V with a 0.2 C constant current. This charging and discharging at 0.2 C was repeated three times. The discharge capacity of the third repetition was taken to be the initial capacity, and a value of initial capacity/theoretical capacity was evaluated by the following standard. A larger value indicates a higher initial discharge capacity.

A: Initial capacity/theoretical capacity of 0.78 or more
B: Initial capacity/theoretical capacity of not less than 0.75 and less than 0.78
C: Initial capacity/theoretical capacity of not less than 0.73 and less than 0.75
D: Initial capacity/theoretical capacity of less than 0.73

<Rate Characteristics of Secondary Battery>

A lithium ion secondary battery produced in each of the examples and comparative examples was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was then discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage: 4.20 V) and CC discharging of the lithium ion secondary battery was performed to a cell voltage of 3.00 V with a 0.2 C constant current. This charging and discharging at 0.2 C was repeated three times.

Next, 0.2 C constant-current charging and discharging of the lithium ion secondary battery was performed between cell voltages of 4.20 V and 3.00 V in an environment having a temperature of 25° C., and the discharge capacity at this time was defined as C0. Thereafter, the lithium ion secondary battery was CC-CV charged with a 0.2 C constant current in the same manner, was subsequently CC discharged to 3.00 V with a 2.0 C constant current in an environment having a temperature of 25° C., and the discharge capacity at this time was defined as C1. The discharge capacity (C1) at 2.0 C as a proportion (percentage; capacity maintenance rate) relative to the discharge capacity (C0) at 0.2 C, which is expressed by (C1/C0)×100(%), was calculated as a rate characteristic and was evaluated by the following standard. A larger value for the capacity maintenance rate indicates less reduction of discharge capacity at high-current and lower internal resistance (i.e., better rate characteristics).

A: Capacity maintenance rate of 75% or more
B: Capacity maintenance rate of not less than 73% and less than 75%
C: Capacity maintenance rate of not less than 70% and less than 73%
D: Capacity maintenance rate of less than 70%

<Cycle Characteristics of Secondary Battery>

A lithium ion secondary battery produced in each of the examples and comparative examples was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was then discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage: 4.20 V) and CC discharging of the lithium ion secondary battery was performed to a cell voltage of 3.00 V with a 0.2 C constant current. This charging and discharging at 0.2 C was repeated three times. Thereafter, the lithium ion secondary battery was subjected to 100 cycles of a charge/discharge operation with a cell voltage of 4.20 V to 3.00 V and a charge/discharge rate of 1.0 C in an environment having a temperature of 25° C. In this cycling, the discharge capacity of the $1^{st}$ cycle was defined as X1 and the discharge capacity of the $100^{th}$ cycle was defined as X2. The discharge capacity X1 and the discharge capacity X2 were used to calculate a capacity maintenance rate (discharge capacity of $100^{th}$ cycle as proportion relative to discharge capacity of $1^{st}$ cycle) expressed by (X2/X1)×100(%) as a cycle characteristic, and the capacity maintenance rate was evaluated by the following standard. A larger value for the capacity maintenance rate indicates better cycle characteristics.

A: Capacity maintenance rate of 93% or more
B: Capacity maintenance rate of not less than 90% and less than 93%
C: Capacity maintenance rate of not less than 87% and less than 90%
D: Capacity maintenance rate of less than 87%

Example 1

<Production of Polymer A>

A 1 L septum-equipped flask that included a stirrer was charged with 100 parts of deionized water, the gas phase was purged with nitrogen gas, and heating was performed to 80° C. Thereafter, 0.3 parts of ammonium persulfate (APS) as a polymerization initiator was dissolved in 5.7 parts of deionized water and was added into the flask.

Meanwhile, a monomer composition was obtained in a separate vessel by mixing 40 parts of deionized water, 0.18 parts of sodium polyoxyethylene alkyl ether sulfate (LATEMUL E-118B produced by Kao Corporation) as an emulsifier, 39.1 parts of n-butyl acrylate (BA) and 55.1 parts of methyl methacrylate (MMA) as (meth)acrylic acid ester monomers, 5.0 parts of methacrylic acid (MAA) as an ethylenically unsaturated acid monomer, and 0.8 parts of allyl methacrylate (AMA) as a cross-linkable monomer. The monomer composition was continuously added to the 1 L septum-equipped flask over 1 hour to carry out polymerization. The reaction was carried out at 80° C. during this addition. After completion of this addition, further stirring was performed at 80° C. for 1 hour to complete the reaction.

Next, a suitable amount of NMP was added to the resultant water dispersion containing a polymer A to obtain a mixture. Thereafter, vacuum distillation was performed at 90° C. to remove water and excess NMP from the mixture and thereby obtain an NMP dispersion (solid content concentration: 8%) of the polymer A.

It was confirmed that the polymer A having a particulate form was dispersed in the dispersion medium (NMP) by drying the obtained NMP dispersion of the polymer A at 120° C. for 1 hour to prepare a film of 0.2 mm to 0.5 mm in thickness, and then confirming that the polymer A maintained a particulate form using a scanning electron microscope (SEM).

<Production of Polymer B1-1>

An Autoclave Equipped with a Stirrer was Charged with 240 Parts of deionized water, 25 parts of sodium alkylbenzene sulfonate as an emulsifier, 24 parts of acrylonitrile as a nitrile group-containing monomer, 43 parts of styrene as an aromatic vinyl monomer, and 4 parts of methacrylic acid as an ethylenically unsaturated acid monomer in this order. The inside of the autoclave was purged with nitrogen, 29 parts of 1,3-butadiene as a conjugated diene monomer was subsequently injected, and 0.25 parts of ammonium persulfate as a polymerization initiator was added to carry out a polymerization reaction at a reaction temperature of 40° C. and thereby obtain a copolymer including nitrile group-containing monomer units, aromatic vinyl monomer units, ethylenically unsaturated acid monomer units, and conjugated diene monomer units. The iodine value of the obtained copolymer (pre-hydrogenation polymer) measured as previously described was 140 g/100 g. The polymerization conversion rate was 85%.

Deionized water was added to the pre-hydrogenation polymer to obtain 400 mL of a solution (total solid content: 48 g) that had been adjusted to a total solid content concentration of 12 mass %. This solution was loaded into an autoclave of 1 L in capacity that was equipped with a stirrer, and dissolved oxygen in the solution was removed by passing nitrogen gas for 10 minutes. Thereafter, 50 mg of palladium acetate as a hydrogenation reaction catalyst was dissolved in 180 mL of deionized water to which nitric acid had been added in an amount of 4 molar equivalents relative to the palladium (Pd), and the resultant solution was added into the autoclave. After purging the system twice with hydrogen gas, the contents of the autoclave were heated to 50° C. in a state in which the hydrogen gas pressure was raised to a gauge pressure of 3 MPa, and a hydrogenation reaction (first stage hydrogenation reaction) was carried out for 6 hours.

Next, the inside of the autoclave was restored to atmospheric pressure, 25 mg of palladium acetate as a hydrogenation reaction catalyst was dissolved in 60 mL of water to which nitric acid had been added in an amount of 4 molar equivalents relative to the Pd, and the resultant solution was added into the autoclave. After purging the system twice with hydrogen gas, the contents of the autoclave were heated to 50° C. in a state in which the hydrogen gas pressure was raised to a gauge pressure of 3 MPa, and a hydrogenation reaction (second stage hydrogenation reaction) was carried out for 6 hours.

Next, the contents of the autoclave were restored to normal temperature, the system was converted to a nitrogen atmosphere, and an evaporator was used to concentrate the contents to a solid content concentration of 40% to obtain a water dispersion of a polymer B1-1 as a polymer B.

After adding 320 parts of N-methylpyrrolidone (hereinafter, referred to as "NMP") as a solvent to 100 parts of the water dispersion of the polymer B1-1 obtained as described above, water was vacuum evaporated to obtain an NMP dispersion of the polymer B1-1.

The weight-average molecular weight and iodine value of the polymer B1-1 were measured by the previously described methods. The results are shown in Table 1.

<Production of Polymer C1>

A reactor A to which a mechanical stirrer and a condenser were attached was charged with 85 parts of deionized water and 0.2 parts of sodium dodecylbenzenesulfonate in a nitrogen atmosphere. The contents of the reactor A were heated to 55° C. under stirring, and a 5.0% aqueous solution of 0.3 parts of potassium persulfate was added into the reactor A. Next, a monomer mixture was produced in a vessel B that was separate to the reactor A by adding 94.0 parts of acrylonitrile as a nitrile group-containing monomer, 1.0 parts of acrylamide as a basic group-containing monomer, 2.0 parts of acrylic acid as an ethylenically unsaturated acid monomer, 3.0 parts of n-butyl acrylate as a (meth)acrylic acid ester monomer, 0.6 parts of sodium dodecylbenzenesulfonate, 0.035 parts of t-dodecyl mercaptan, 0.4 parts of polyoxyethylene lauryl ether, and 80 parts of deionized water into the vessel B in a nitrogen atmosphere and performing stirring and emulsification thereof. The monomer mixture was added into the reactor A at a constant rate over 5 hours while in a stirred and emulsified state and a reaction was carried out until the polymerization conversion rate reached 95% to yield a water dispersion of a polyacrylonitrile (PAN) copolymer (polymer C1) including mainly acrylonitrile units (94 mass %). Next, a suitable amount of NMP was added to the obtained water dispersion of the polymer C1 to obtain a mixture. Thereafter, vacuum distillation was performed at 90° C. to remove water and excess NMP from the mixture and thereby obtain an NMP solution (solid content concentration: 8%) of the polymer C1.

<Production of Slurry Composition for Secondary Battery Positive Electrode>

[Preliminary Mixing Step]

After adding 1 part of CNTs (specific surface area measured by BET method: 150 m$^2$/g) as a conductive material and 0.06 parts in terms of solid content of the polymer B1-1 to a Disper, NMP was further added as an organic solvent to adjust the solid content concentration to 4 mass %, and then 10 minutes of stirred mixing was performed at a temperature of 25±3° C. and a rotation speed of 3,000 rpm to obtain a preliminary mixture.

[Main Mixing Step]

After adding 97 parts of an active material NMC532 based on a lithium complex oxide of Co—Ni—Mn (LiNi$_{5/10}$Co$_{2/10}$Mn$_{3/10}$O$_2$) as a positive electrode active material, 0.38 parts (in terms of solid content) of the polymer A, and 1.56 parts (in terms of solid content) of the polymer C to the preliminary mixture obtained in the step described above, stirred mixing thereof was performed at a temperature of 25±3° C. and a rotation speed of 50 rpm to obtain a slurry composition for a positive electrode having a viscosity of 3,600 mPa·s as measured using a B-type viscometer under conditions of 60 rpm (M4 rotor) and 25±3° C.

<Production of Positive Electrode>

The slurry composition for a positive electrode obtained as described above was applied onto aluminum foil of 20 μm in thickness serving as a current collector by a comma coater such as to have a coating weight of 20±0.5 mg/cm$^2$.

The slurry composition on the aluminum foil was dried by conveying the aluminum foil inside a 100° C. oven for 2 minutes and a 130° C. oven for 2 minutes at a speed of 200 mm/min to obtain a positive electrode web including a positive electrode mixed material layer formed on the current collector.

Thereafter, the positive electrode mixed material layer side of the produced positive electrode web was roll pressed with a line pressure of 14 t (tons) in an environment having a temperature of 25±3° C. to obtain a positive electrode having a positive electrode mixed material layer density of 3.50 g/cm$^3$. The peel strength of the positive electrode mixed material layer was evaluated for the obtained positive electrode by the previously described method. The result is shown in Table 1.

<Production of Binder Composition for Negative Electrode>

A 5 MPa pressure vessel equipped with a stirrer was charged with 65 parts of styrene, 35 parts of 1,3-butadiene, 2 parts of itaconic acid, 1 part of 2-hydroxyethyl acrylate, 0.3 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator. These materials were sufficiently stirred and were then heated to a temperature of 55° C. to initiate polymerization. The reaction was quenched by cooling at the point at which monomer consumption reached 95.0%. A water dispersion containing a polymer that was obtained in this manner was adjusted to pH 8 through addition of 5% sodium hydroxide aqueous solution. Unreacted monomer was subsequently removed through thermal-vacuum distillation. Thereafter, cooling was performed to a temperature of 30° C. or lower to yield a water dispersion containing a binder for a negative electrode.

<Production of Slurry Composition for Negative Electrode>

A planetary mixer was charged with 48.75 parts of artificial graphite (theoretical capacity: 360 mAh/g) and 48.75 parts of natural graphite (theoretical capacity: 360 mAh/g) as negative electrode active materials, and 1 part in terms of solid content of carboxymethyl cellulose as a thickener. These materials were diluted to a solid content concentration of 60% with deionized water and were subsequently kneaded at a rotation speed of 45 rpm for 60 minutes. Thereafter, 1.5 parts in terms of solid content of the binder composition for a negative electrode obtained as described above was added and was kneaded therewith at a rotation speed of 40 rpm for 40 minutes. Deionized water was then added to adjust the viscosity to 3,000±500 mPa·s (measured by a B-type viscometer at 25° C. and 60 rpm) and thereby produce a slurry composition for a negative electrode.

<Production of Negative Electrode>

The slurry composition for a negative electrode was applied onto the surface of copper foil of 15 μm in thickness serving as a current collector by a comma coater such as to have a coating weight of 11±0.5 mg/cm$^2$. The copper foil with the slurry composition for a negative electrode applied thereon was subsequently conveyed inside an 80° C. oven for 2 minutes and a 110° C. oven for 2 minutes at a speed 400 mm/min to dry the slurry composition on the copper foil and obtain a negative electrode web including a negative electrode mixed material layer formed on the current collector.

Thereafter, the negative electrode mixed material layer side of the produced negative electrode web was roll pressed with a line pressure of 11 t (tons) in an environment having a temperature of 25±3° C. to obtain a negative electrode having a negative electrode mixed material layer density of 1.60 g/cm$^3$.

<Preparation of Separator for Secondary Battery>

A separator made from a single layer of polypropylene (#2500 produced by Celgard, LLC.) was used.

<Production of Non-Aqueous Secondary Battery>

A single-layer laminated cell (initial design discharge capacity: equivalent to 40 mAh) was produced using the negative electrode, positive electrode, and separator described above and was arranged inside aluminum packing. The aluminum packing was subsequently filled with a LiPF$_6$ solution of 1.0 M in concentration (solvent: mixed solvent of ethylene carbonate (EC)/diethyl carbonate (DEC)=3/7 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery.

The lithium ion secondary battery was used to evaluate the initial capacity, rate characteristics, and cycle characteristics as previously described. The results are shown in Table 1.

Examples 2 and 3

A polymer B1-2 (Example 2) or a polymer B1-3 (Example 3) was obtained by changing the hydrogenation reaction conditions in production of the polymer B such that the iodine value was a value shown in Table 1. With the exception of this point, various operations, measurements, and evaluations were performed in the same way as in Example 1. The results are shown in Table 1.

Example 4

Various operations, measurements, and evaluations were performed in the same way as in Example 1 with the exception that a polymer B2 produced as described below was used as the polymer B. The results are shown in Table 1.

<Production of Polymer B2>

An autoclave equipped with a stirrer was charged with 240 parts of deionized water, 25 parts of sodium alkylbenzene sulfonate as an emulsifier, 40 parts of acrylonitrile as a nitrile group-containing monomer, and 4 parts of methacrylic acid as an ethylenically unsaturated acid monomer in this order. The inside of the autoclave was purged with nitrogen, 56 parts of 1,3-butadiene was then injected as a conjugated diene monomer, and 0.25 parts of ammonium persulfate was added as a polymerization initiator to carry out a polymerization reaction at a reaction temperature of 40° C. and thereby obtain a copolymer including nitrile group-containing monomer units, ethylenically unsaturated acid monomer units, and conjugated diene monomer units. The iodine value of the obtained copolymer (pre-hydrogenation polymer) measured as previously described was 270 g/100 g. The polymerization conversion rate was 85%.

Deionized water was added to the pre-hydrogenation polymer to obtain 400 mL of a solution (total solid content: 48 g) that had been adjusted to a total solid content concentration of 12 mass %. This solution was loaded into an autoclave of 1 L in capacity that was equipped with a stirrer, and dissolved oxygen in the solution was removed by passing nitrogen gas for 10 minutes. Thereafter, 50 mg of palladium acetate as a hydrogenation reaction catalyst was dissolved in 180 mL of deionized water to which nitric acid had been added in an amount of 4 molar equivalents relative to the palladium (Pd), and the resultant solution was added into the autoclave. After purging the system twice with hydrogen gas, the contents of the autoclave were heated to 50° C. in a state in which the hydrogen gas pressure was raised to a gauge pressure of 3 MPa, and a hydrogenation reaction (first stage hydrogenation reaction) was carried out for 6 hours.

Next, the inside of the autoclave was restored to atmospheric pressure, 25 mg of palladium acetate as a hydrogenation reaction catalyst was dissolved in 60 mL of water to which nitric acid had been added in an amount of 4 molar equivalents relative to the Pd, and the resultant solution was added into the autoclave. After purging the system twice with hydrogen gas, the contents of the autoclave were heated to 50° C. in a state in which the hydrogen gas pressure was raised to a gauge pressure of 3 MPa, and a hydrogenation reaction (second stage hydrogenation reaction) was carried out for 6 hours.

Next, the contents of the autoclave were restored to normal temperature, the system was converted to a nitrogen atmosphere, and an evaporator was used to concentrate the contents to a solid content concentration of 40% to obtain a water dispersion of a polymer B2 as a polymer B.

After adding 320 parts of NMP as a solvent to 100 parts of the water dispersion of the polymer B2 obtained as described above, water was vacuum evaporated to obtain an NMP dispersion of the polymer B2.

The weight-average molecular weight and iodine value of the polymer B2 were measured by the previously described methods. The results are shown in Table 1.

Example 5

Various operations, measurements, and evaluations were performed in the same way as in Example 1 with the exception that a polymer C2 produced as described below was used as the polymer C. The results are shown in Table 1.
<Production of Polymer C2>

A water dispersion of a polyacrylonitrile (PAN) copolymer (polymer C2) in which the proportional content of acrylonitrile units was 72 mass % was obtained in the same way as in Example 1 with the exception that the amounts of acrylonitrile, acrylamide, acrylic acid, and n-butyl acrylate that were added into the reactor B were changed to 72 parts of acrylonitrile, 2 parts of acrylamide, 8 parts of acrylic acid, and 18 parts of n-butyl acrylate. Solvent replacement with NMP was performed in the same way as in Example 1 to obtain an NMP solution (solid content concentration: 8%) of the polymer C2.

Example 6

Various operations, measurements, and evaluations were performed in the same way as in Example 1 with the exception that the amounts of the polymers A to C used in production of the slurry composition for a secondary battery positive electrode were changed as shown in Table 1. The results are shown in Table 1.

Comparative Examples 1 to 3

Various operations, measurements, and evaluations were performed in the same way as in Example 1 with the exception that one of the polymers A to C was not used and the amounts of the other polymers were changed as shown in Table 1 in production of the slurry composition for a secondary battery positive electrode. The results are shown in Table 1.

Comparative Example 4

A polymer B1-4 was obtained by changing the hydrogenation reaction conditions in production of the polymer B1 such that the iodine value was a value shown in Table 1. With the exception that this polymer B1-4 was used, various operations, measurements, and evaluations were performed in the same way as in Example 1. The results are shown in Table 1.

Comparative Example 5

A polymer $C_3$ produced as described below was used as the polymer C in production of the slurry composition for a secondary battery positive electrode. With the exception that this polymer $C_3$ was used, various operations, measurements, and evaluations were performed in the same way as in Example 1. The results are shown in Table 1.
<Production of Polymer C3>

A water dispersion of a copolymer (polymer C3) in which the proportional content of acrylonitrile units was 50 mass % was obtained in the same way as in Example 1 with the exception that the amounts of acrylonitrile, acrylamide, acrylic acid, and n-butyl acrylate that were added into the reactor B were changed to 50 parts of acrylonitrile, 10 parts of acrylamide, 20 parts of acrylic acid, and 20 parts of n-butyl acrylate. Solvent replacement with NMP was performed in the same way as in Example 1 to obtain an NMP solution (solid content concentration: 8%) of the polymer C3.

In Table 1, shown below:

"MMA" indicates methyl methacrylate;

"BA" indicates n-butyl acrylate;

"MAA" indicates methacrylic acid;

"AMA" indicates allyl methacrylate;

"ST" indicates styrene;

"AN" indicates acrylonitrile;

"H-BD" indicates hydrogenated 1,3-butadiene unit; and

"CNT" indicates carbon nanotubes.

TABLE 1

|  |  |  | Examples | | | | | |
| --- | --- | --- | --- | --- | --- | --- | --- | --- |
|  |  |  | 1 | 2 | 3 | 4 | 5 | 6 |
| Slurry composition for non-aqueous secondary battery electrode | Polymer A (binder) | (Meth)acrylic acid ester monomer unit | MMA/BA | MMA/BA | MMA/BA | MMA/BA | MMA/BA | MMA/BA |
|  |  | Ethylenically unsaturated acid monomer unit | MAA | MAA | MAA | MAA | MAA | MAA |
|  |  | Cross-linkable monomer unit | AMA | AMA | AMA | AMA | AMA | AMA |
|  | Polymer B (binder) | Type | B1-1 | B1-2 | B1-3 | B2 | B1-1 | B1-1 |
|  |  | Chemical composition | ST/AN/H-BD/MAA | ST/AN/H-BD/MAA | ST/AN/H-BD/MAA | AN/H-BD/MAA | ST/AN/H-BD/MAA | ST/AN/H-BD/MAA |
|  |  | Iodine value (g/100 g) | 50 | 10 | 80 | 80 | 50 | 50 |
|  |  | Weight-average molecular weight (—) | 300,000 | 300,000 | 300,000 | 20,000 | 300,000 | 300,000 |
|  | Polymer C (binder) | Type | C1 | C1 | C1 | C1 | C2 | C1 |
|  |  | Acrylonitrile monomer unit (mass %) | 94 | 94 | 94 | 94 | 72 | 94 |
|  | Fraction a of polymer A (mass %; based on total amount of A to C) |  | 19 | 19 | 19 | 19 | 19 | 15 |
|  | Fraction b of polymer B (mass %; based on total amount of A to C) |  | 3 | 3 | 3 | 3 | 3 | 30 |
|  | Fraction c of polymer C (mass %; based on total amount of A to C) |  | 78 | 78 | 78 | 78 | 78 | 55 |
|  | a/(a + c) × 100(%) |  | 20 | 20 | 20 | 20 | 20 | 21 |
|  | a/(a + b) × 100(%) |  | 86 | 86 | 86 | 86 | 86 | 33 |
|  | Amount of NMP-insoluble content in ABC mixture (mass %) |  | 40 | 40 | 40 | 40 | 40 | 40 |
|  | Active material | Type | NMC | NMC | NMC | NMC | NMC | NMC |
|  |  | Amount (parts by mass) | 97 | 97 | 97 | 97 | 97 | 97 |
|  | Conductive material | Type | CNT | CNT | CNT | CNT | CNT | CNT |
|  |  | Amount (parts by mass) | 1 | 1 | 1 | 1 | 1 | 1 |
|  | Binder | Type | A, B, C | A, B, C | A, B, C | A, B, C | A, B, C | A, B, C |
|  |  | Amount (parts by mass) | 2 | 2 | 2 | 2 | 2 | 2 |
| Evaluation | Solid content concentration of slurry composition |  | A | B | A | A | A | A |
|  | Electrode mixed material layer peel strength |  | A | A | A | B | A | B |
|  | Secondary battery initial capacity |  | A | A | A | A | A | B |
|  | Secondary battery rate characteristics |  | A | B | A | A | A | B |
|  | Secondary battery cycle characteristics |  | A | B | A | A | B | B |

|  |  |  | Comparative examples | | | | |
| --- | --- | --- | --- | --- | --- | --- | --- |
|  |  |  | 1 | 2 | 3 | 4 | 5 |
| Slurry composition for non-aqueous secondary battery electrode | Polymer A (binder) | (Meth)acrylic acid ester monomer unit | MMA/BA | MMA/BA | — | MMA/BA | MMA/BA |
|  |  | Ethylenically unsaturated acid monomer unit | MAA | MAA | — | MAA | MAA |
|  |  | Cross-linkable monomer unit | AMA | AMA | — | AMA | AMA |
|  | Polymer B (binder) | Type | B1-1 | — | B1-1 | B1-4 | B1-1 |
|  |  | Chemical composition | ST/AN/H-BD/MAA | — | ST/AN/H-BD/MAA | ST/AN/H-BD/MAA | ST/AN/H-BD/MAA |
|  |  | Iodine value (g/100 g) | 50 | — | 50 | 120 | 50 |
|  |  | Weight-average molecular weight (—) | 300,000 | — | 300,000 | 300,000 | 300,000 |
|  | Polymer C (binder) | Type | — | C1 | C1 | C1 | C1 |
|  |  | Acrylonitrile monomer unit (mass %) | — | 94 | 94 | 94 | 50 |
|  | Fraction a of polymer A (mass %; based on total amount of A to C) |  | 60 | 20 | 0 | 19 | 19 |
|  | Fraction b of polymer B (mass %; based on total amount of A to C) |  | 40 | 0 | 10 | 3 | 3 |
|  | Fraction c of polymer C (mass %; based on total amount of A to C) |  | 0 | 80 | 90 | 78 | 78 |
|  | a/(a + c) × 100(%) |  | 100 | 20 | 0 | 20 | 20 |
|  | a/(a + b) × 100(%) |  | 60 | 100 | 0 | 86 | 86 |
|  | Amount of NMP-insoluble content in ABC mixture (mass %) |  | 70 | 40 | 0 | 40 | 40 |
|  | Active material | Type | NMC | NMC | NMC | NMC | NMC |
|  |  | Amount (parts by mass) | 97 | 97 | 97 | 97 | 97 |

TABLE 1-continued

| Conductive material | Type | CNT | CNT | CNT | CNT | CNT |
|---|---|---|---|---|---|---|
| | Amount (parts by mass) | 1 | 1 | 1 | 1 | 1 |
| Binder | Type | A, B | A, C | B, C | A, B, C | A, B, C |
| | Amount (parts by mass) | 2 | 2 | 2 | 2 | 2 |
| Solid content concentration of slurry composition | | A | D | B | A | B |
| Electrode mixed material layer peel strength | | D | A | D | B | B |
| Secondary battery initial capacity | | D | B | B | C | B |
| Secondary battery rate characteristics | | D | C | B | C | C |
| Secondary battery cycle characteristics | | D | C | B | C | D |

It can be seen from Table 1 that in Examples 1 to 7 in which a binder composition containing the specific polymers A to C was used, it was possible to sufficiently increase the solid content concentration of a slurry composition and the peel strength of an electrode mixed material layer. It can also be seen that battery characteristics of a secondary battery could be enhanced in these examples. Moreover, it can be seen from Table 1 that it was not possible to achieve a balance of increasing the solid content concentration of a slurry composition and the peel strength of an electrode mixed material layer while also enhancing battery characteristics of a secondary battery in Comparative Examples 1 to 5 in which any one of the polymers A to C was absent.

INDUSTRIAL APPLICABILITY

According to the present disclosure, it is possible to provide a binder composition for a non-aqueous secondary battery electrode that can sufficiently increase the solid content concentration of an obtained slurry composition and the peel strength of an obtained electrode mixed material layer, and that can also enhance battery characteristics of a secondary battery including an obtained electrode.

Moreover, according to the present disclosure, it is possible to provide a slurry composition for a non-aqueous secondary battery electrode, and method of producing the same, that has a sufficiently high solid content concentration, that can sufficiently increase the peel strength of an obtained electrode mixed material layer, and that can enhance battery characteristics of an obtained secondary battery.

Furthermore, according to the present disclosure, it is possible to provide an electrode for a non-aqueous secondary battery that can sufficiently improve battery characteristics of a non-aqueous secondary battery and a non-aqueous secondary battery that has excellent battery characteristics such as rate characteristics and cycle characteristics.

The invention claimed is:

1. A binder composition for a non-aqueous secondary battery electrode comprising a polymer A, a polymer B, a polymer C, and an organic solvent, wherein
the polymer A is a particulate polymer including a (meth)acrylic acid ester monomer unit,
the polymer B is a highly soluble polymer, having insoluble content to N-methyl-2-pyrrolidone of 50 mass % or less, having an iodine value of not less than 5 g/100 g and not more than 100 g/100 g,
the polymer C is a highly soluble polymer, having insoluble content to N-methyl-2-pyrrolidone of 50 mass % or less, including a nitrile group-containing monomer unit in a proportion of not less than 70 mass % and not more than 98 mass % when all monomer units of the polymer C are taken to be 100 mass %, in total,
the polymer C further includes at least one of amino group-containing monomer unit or amide group-containing monomer unit, and
when total content of the polymer A, the polymer B, and the polymer C is taken to be 100 mass %, the polymer B is contained in a fraction b of not more than 25 mass %.

2. The binder composition for a non-aqueous secondary battery electrode according to claim 1, wherein the polymer A further includes an ethylenically unsaturated acid monomer unit.

3. The binder composition for a non-aqueous secondary battery electrode according to claim 1, wherein the polymer B has a weight-average molecular weight of not less than 5,000 and not more than 500,000.

4. The binder composition for a non-aqueous secondary battery electrode according to claim 1, wherein
when total content of the polymer A, the polymer B, and the polymer C is taken to be 100 mass %,
the polymer A is contained in a fraction a of not less than 5 mass % and not more than 60 mass %,
the polymer B is contained in a fraction b of not less than 0.1 mass % and not more than 25 mass %, and
the polymer C is contained in a fraction c of not less than 20 mass % and not more than 94 mass %.

5. The binder composition for a non-aqueous secondary battery electrode according to claim 4, wherein the fraction a and the fraction c satisfy a relationship: $10 \leq a/(a+c) \times 100 \leq 50$.

6. The binder composition for a non-aqueous secondary battery electrode according to claim 4, wherein the polymers A to C are polymers satisfying a condition that when an N-methyl-2-pyrrolidone mixture of 8 mass % in solid content concentration that contains the polymer A in the fraction a, the polymer B in the fraction b, and the polymer C in the fraction c as solid content is produced, a proportion of insoluble content in the mixture is not less than 30 mass % and not more than 80 mass %.

7. A slurry composition for a non-aqueous secondary battery electrode comprising: the binder composition for a non-aqueous secondary battery electrode according to claim 1; an electrode active material; and a conductive material, wherein
the conductive material includes one or more carbon nanotubes.

8. An electrode for a non-aqueous secondary battery comprising an electrode mixed material layer formed using the slurry composition for a non-aqueous secondary battery electrode according to claim 7.

9. A non-aqueous secondary battery comprising the electrode for a non-aqueous secondary battery according to claim 8.

10. A method of producing a slurry composition for a non-aqueous secondary battery electrode that is a method of producing the slurry composition for a non-aqueous secondary battery electrode according to claim 7, comprising:
- a preliminary mixing step of mixing at least the carbon nanotubes, the polymer B, and the organic solvent to obtain a preliminary mixture; and
- a main mixing step of mixing the preliminary mixture with at least the polymer A and the polymer C.

* * * * *